June 3, 1952  A. A. BERESTNEFF  2,599,428
TUBE BUNDLE FOR HEAT EXCHANGERS
Original Filed July 13, 1946  2 SHEETS—SHEET 2
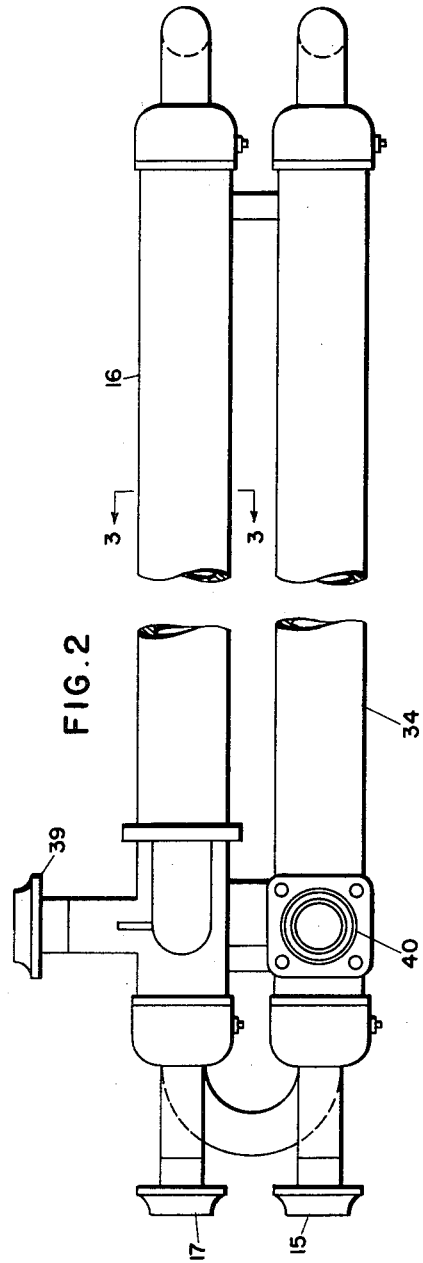
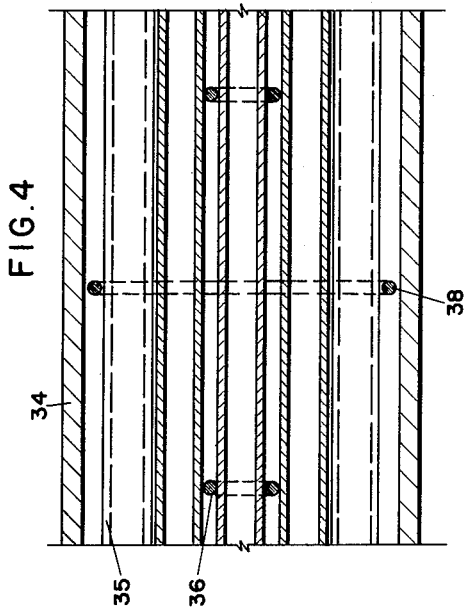
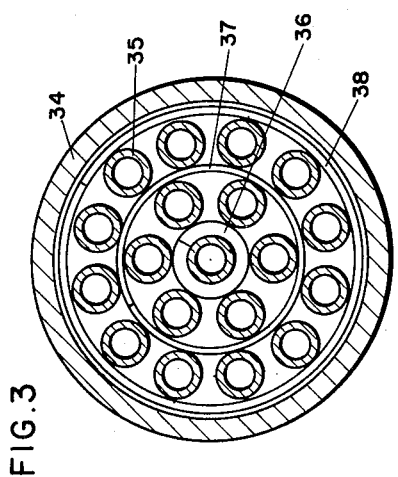
INVENTOR.
Alexis A. Berestneff
BY
ATTY.

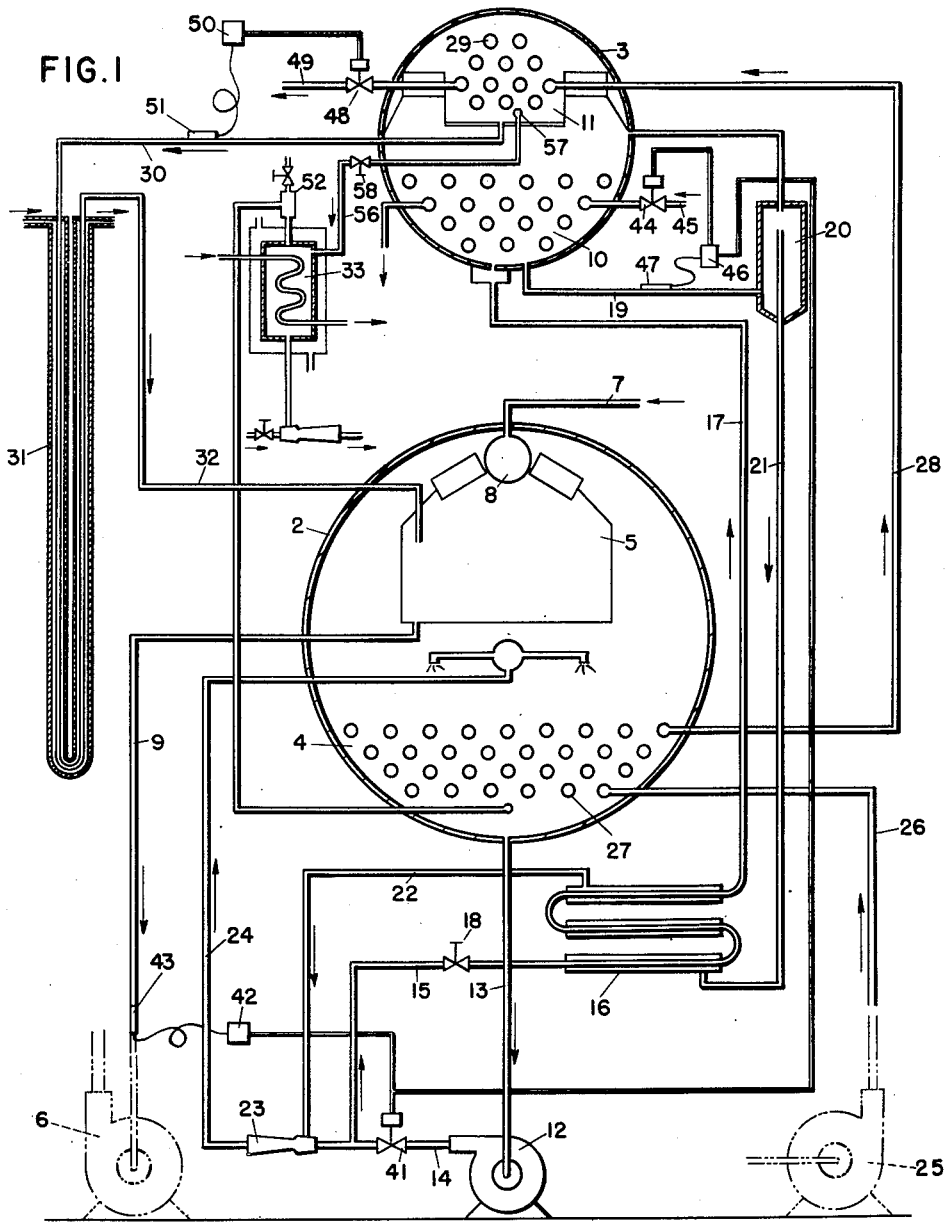

Patented June 3, 1952

2,599,428

UNITED STATES PATENT OFFICE 2,599,428

TUBE BUNDLE FOR HEAT EXCHANGERS

Alexis A. Berestneff, Syracuse, N. Y., assignor to Carrier Corporation, Syracuse, N. Y., a corporation of Delaware Original application July 13, 1946, Serial No. 683,387. Divided and this application May 27, 1948, Serial No. 29,525

2 Claims. (Cl. 257—236)

This application is a division of my co-pending application, Serial No. 683,387, filed July 13, 1946, now Patent No. 2,565,943 entitled Absorption Refrigeration Systems, and relates to an absorption refrigeration system including a novel and improved heat exchange member for placing strong and weak solutions in heat exchange relation with one another.

The chief object of the present invention is to provide an absorption refrigeration system including a novel heat exchanger for strong and weak solutions.

An object of the present invention is to provide an improved heat exchanger for use in absorption refrigeration systems.

A further object is to provide a novel heat exchanger for use in absorption refrigeration systems which permits more satisfactory and economical operation of the system. Other objects of my invention will be readily perceived from the following description.

This invention relates to an absorption refrigeration system which comprises a horizontally extending shell having an absorber arrangement disposed in said shell and extending longitudinally thereof, an evaporator arrangement in said shell above the absorber arrangement, and a second horizontally extending shell placed above the first shell. A generator arrangement is disposed in the second shell and extends longitudinally thereof; a condenser is also disposed in the second shell above the generator arrangement. Means are provided for withdrawing solution from the generator and for forwarding the solution to the absorber and means are provided for circulating solution from the absorber to the generator. A heat exchanger serves to place the strong and weak solutions in heat exchange relation with one another thereby decreasing the cost of operation of the system. Refrigerant is forwarded to the evaporator, the refrigerant being flash cooled in the evaporator; the flashed vapor passes downward about the evaporator to the absorber to be absorbed by solution therein. In the generator substantially the same amount of vapor is boiled out, passed to the condenser, is condensed and returned to the chilled water circuit. Control arrangements are provided for maintaining the capacity of and the concentration of solution in the system as well as pressure, temperature of cooling water and the flow of solution and of condensing water.

The attached drawings illustrate a preferred embodiment of my invention in which Figure 1 is a diagrammatic view illustrating the flow of solution through the various elements of the refrigeration system;

Figure 2 is a view in elevation of the heat exchanger;

Figure 3 is a sectional view on the line 3—3 of Figure 2; and

Figure 4 is a sectional view longitudinally of the heat exchanger.

Referring to the drawings there are shown horizontally extending drums or shells 2 and 3, shell 3 preferably being secured in place above shell 2; shell 2 encloses a longitudinally extending absorber arrangement 4 and a longitudinally extending evaporator arrangement 5 disposed above absorber 4. Chilled water treated by the system is circulated by a pump 6 through an air conditioning device of any desired type (not shown) and is returned from the air conditioning device to evaporator 5 through line 7. The chilled water is sprayed in evaporator 5 by a suitable spray arrangement 8, the chilled water being flash cooled in the evaporator and being drawn from the evaporator through line 9 by pump 6 and again forwarded to the air conditioning device.

Shell 3 encloses a longitudinally extending generator 10 and a longitudinally extending condenser arrangement 11 disposed above the generator 10. Weak solution is withdrawn from absorber 4 by pump 12 through line 13 and is forwarded to generator 10 through lines 14, 15, heat exchanger 16 and line 17. A restriction 18 may be disposed in line 15. Strong solution is withdrawn from generator 10 through line 19, overflow arrangement 20, line 21, heat exchanger 16 and line 22, to an ejector 23 which forwards strong solution through line 24 to the absorber 4. Line 22 is looped to maintain an adequate quantity of strong solution within heat exchanger 16 for heat exchange purposes. The strong and weak solution lines are placed in heat exchange relation by means of heat exchanger 16.

The term "weak solution" is used herein to define a solution containing a large amount of refrigerant so that the solution is weak in absorbing properties. The term "strong solution" defines a solution which is relatively deficient in refrigerant and consequently a solution which possesses enhanced properties of refrigerant absorption.

Various combinations of refrigerant and absorber may be used in the present system. I have found that a solution consisting of lithium bromide and water is highly satisfactory for use. Other salt solutions may be used if desired in this system when this system is operated at high temperatures (above freezing temperature); a solution of lithium chloride and water or a solution of sodium hydroxide and water may be used. When the present invention is used to attain low temperatures, ammonia may be used as a refrigerant.

A pump 25 passes cooling or condensing water through line 26 to the coil 27 of absorber 4 and then forwards the water after its passage through absorber 4, through line 28 to the coil 29 of condenser 11. After passage through coil 29 of the condenser 11, the water is discharged or, if desired, may be re-used as in the case of a cooling tower.

A line 30 is adapted to withdraw vapor condensate from condenser 11, the vapor condensate passing through a pre-cooler assembly 31 and then being returned through line 32 to the evaporator 5. Condensate pre-cooler 31 consists of a double pipe assembly in which a cooling medium is passed in heat exchange relation with the vapor condensate. Pre-cooler 31 is shaped in the form of a loop to maintain a secure liquid seal between shells 2 and 3 thus permitting different pressures to be maintained in such shells without escape of vapor. A suitable purge arrangement 33 is provided to purge condenser 11 and absorber 4 of air or other non-condensible gases. Purge 33 may operate intermittently or continuously as desired.

Referring to Figures 2, 3, and 4, heat exchanger 16 includes a plurality of connected pipes 34 for the passage of strong solution. Disposed in each of said pipes is a plurality of smaller pipes 35 assembled together for the passage of weak solution from absorber 4 to generator 10. Pipes 35 are held in spaced position by means of wires 36, disposed at intervals along the length thereof. Referring to Figures 3 and 4, it will be noted that wires 36 are disposed about the innermost pipe 35 at intervals along its length. A plurality of pipes 35 are disposed thereabout and wires 37 at spaced intervals serve to hold such pipes in spaced position to the innermost pipes. A plurality of pipes 35 are disposed thereabout and wires 38 at spaced intervals serve to hold such pipes in the desired position. The wires 36, 37, and 38 permit pipes 35 to be spaced from one another, thus assuring adequate heat exchange relation between strong solution passing through pipes 34 and weak solution passing through pipes 35. Strong solution is passed into heat exchanger 16 at point 39, connected to line 21, and is removed therefrom at point 40, connected to line 22. Weak solution is passed into exchanger 16 from line 15 and is removed therefrom through line 17.

It is desirable that the capacity be changed immediately upon change in load to obtain most satisfactory operation. The temperature of the chilled water may be used to indicate a change in load since a decrease in the temperature thereof from a pre-determined point indicates that the load imposed upon this system has decreased. As the temperature of the chilled water leaving the evaporator decreases, the capacity of the system may be decreased by throttling the volume of strong solution passing to the absorber.

For this purpose a valve 41 is placed in line 14 between ejector 23 and pump 12. Valve 41 is actuated by a thermostat control 42 operated by a bulb 43 placed in or adjacent to line 9. As the temperature of chilled water passing through line 9 decreases, fluid in bulb 43 contracts. The control 42 in accordance therewith tends to move valve 41 toward a closed position, thereby decreasing the amount of weak solution being forwarded to generator 10 through lines 15 and 17, proportionately to the decrease in the temperature of the chilled water. Movement of valve 41 toward a closed position also decreases proportionately the amount of weak solution passing to the ejector 23. The reduction in the amount of weak solution passing to ejector 23 reduces the velocity of such solution through the nozzle of the ejector and consequently a smaller quantity of strong solution is entrained or induced from line 22. Throttling action of valve 41 reduces the amount of solution passing to and returning from generator 10 and likewise reduces the amount of solution passing to ejector 23 and forwarded to the absorber 4.

A valve 44 is provided in steam line 45 to control the amount of steam passing into the tubes of generator 10 in accordance with the load imposed upon the system. Valve 44 is actuated by thermostat control 46, operated in turn by a bulb 47, disposed in or adjacent to line 19. The amount of condensing water passing through condenser 11 is controlled by means of valve 48 placed in line 49, actuated by thermostat control 50, controlled by bulb 51, disposed in or adjacent to vapor condensate line 30.

The present invention provides an improved absorption refrigeration system of increased efficiency and containing an inexpensive heat exchanger which serves to reduce materially the expense of operation of the system. The heat exchanger included in the absorption refrigeration system may be readily assembled and disposed in desired position within the system as described above; its cost is low and its use permits substantial reduction in operating cost.

While I have described a preferred embodiment of my invention, it will be understood my invention is not limited thereto since it may be otherwise embodied within the scope of the following claims.

I claim:

1. A heat exchanger which comprises a bundle of pipes disposed in spaced relation through which a fluid may be passed, spaced members extending about the innermost pipe of said bundle and spaced longitudinally thereof, a row of pipes placed about said innermost pipe in spaced relation to one another and spaced from the innermost pipe by said members, second members extending in longitudinally spaced positions about all the pipes of said row, a second row of pipes placed about the first row in spaced relation to one another and spaced from the first row by said members, third members extending about all the pipes of the second row and spaced longitudinally thereof and a pipe enclosing and supporting the bundle through which another fluid is passed, said pipe being held in spaced relation to said bundle by the outer members disposed thereabout.

2. A heat exchanger according to claim 1 in which said spaced members consist of wires spaced longitudinally of the tubes and disposed about and holding the rows of pipes in spaced relation to one another.

ALEXIS A. BERESTNEFF.

REFERENCES CITED

The following references are of record in the file of this patent:

UNITED STATES PATENTS

| Number | Name | Date |
|---|---|---|
| 660,292 | Durr | Oct. 23, 1900 |
| 2,146,614 | Bergdoll | Feb. 7, 1939 |
| 2,229,344 | Schneider | Jan. 21, 1941 |
| 2,267,568 | Kleucker | Dec. 23, 1941 |
| 2,282,503 | Thomas et al. | May 12, 1942 |
| 2,408,480 | Reid | Oct. 1, 1946 |
| 2,432,978 | Anderson | Dec. 23, 1947 |
| 2,499,901 | Brown | Mar. 7, 1950 |

FOREIGN PATENTS

| Number | Country | Date |
|---|---|---|
| 488,944 | Great Britain | July 18, 1938 |
| 664,544 | France | Sept. 4, 1929 |